US009208610B2

(12) United States Patent
Merrell et al.

(10) Patent No.: US 9,208,610 B2
(45) Date of Patent: Dec. 8, 2015

(54) ALTERNATE SCENE REPRESENTATIONS FOR OPTIMIZING RENDERING OF COMPUTER GRAPHICS

(75) Inventors: Jacob Porter Merrell, El Sobrante, CA (US); Apurva Shah, San Mateo, CA (US)

(73) Assignee: Pixar, Emeryville, CA (US)

( * ) Notice: Subject to any disclaimer, the term of this patent is extended or adjusted under 35 U.S.C. 154(b) by 132 days.

(21) Appl. No.: 13/194,171

(22) Filed: Jul. 29, 2011

(65) Prior Publication Data

US 2013/0027417 A1    Jan. 31, 2013

(51) Int. Cl.
G06T 15/06    (2011.01)
G06T 17/00    (2006.01)

(52) U.S. Cl.
CPC .............. G06T 17/005 (2013.01); G06T 15/06 (2013.01); *G06T 2210/36* (2013.01); *G06T 2210/61* (2013.01)

(58) Field of Classification Search
CPC ............ G09G 5/02; G09G 2340/0407; G09G 2340/02; G09G 2300/0452; G09G 2340/0457; G09G 2340/0421; G06T 1/60; G06T 15/005; G06T 5/002; G06T 9/00; H04N 5/44504; H04N 19/436; H04N 9/641; H04N 13/0029
See application file for complete search history.

(56) References Cited

U.S. PATENT DOCUMENTS

| | | | | |
|---|---|---|---|---|
| 8,692,844 | B1 * | 4/2014 | Molnar et al. | 345/611 |
| 2008/0033277 | A1 * | 2/2008 | Yang et al. | 600/407 |
| 2009/0284529 | A1 * | 11/2009 | De Aguiar et al. | 345/420 |
| 2011/0081094 | A1 * | 4/2011 | Damkat | 382/254 |

* cited by examiner

*Primary Examiner* — Maurice L McDowell, Jr.
*Assistant Examiner* — Raffi Isanians
(74) *Attorney, Agent, or Firm* — Kilpatrick Townsend & Stockton LLP

(57) ABSTRACT

Shading attributes for scene geometry are predetermined and cached in one or more alternate scene representations. Lighting, shading, geometric, and/or other attributes of the scene may be precalculated and stored for at least one of the scene representations at an appropriate level of detail. Rendering performance is improved generally and for a variety of visual effects by selecting between alternate scene representations during rendering. A renderer selects one or more of the alternate scene representations for each of the samples based on the size of its filter area relative to the feature sizes or other attributes of the alternate scene representations. If two or more alternate scene representations are selected, the sampled values from these scene representations may be blended. The selection of scene representations may vary on a per-sample basis and thus different scene representations may be used for different samples within the same image.

28 Claims, 5 Drawing Sheets

150

175

ALTERNATE SCENE REPRESENTATIONS FOR OPTIMIZING RENDERING OF COMPUTER GRAPHICS

BACKGROUND OF THE INVENTION

The present invention relates to the field of computer graphics, and in particular to methods and apparatus for assigning attribute values to surfaces of computer graphics models. Many computer graphic images are created by mathematically modeling the interaction of light with a three dimensional scene from a given viewpoint. This process, called rendering, generates a two-dimensional image of the scene from the given viewpoint, and is analogous to taking a photograph of a real-world scene. Animated sequences can be created by rendering a sequence of images of a scene as the scene is gradually changed over time. A great deal of effort has been devoted to making realistic looking rendered images and animations.

Many rendering effects are performed by sampling a three-dimensional scene at discrete points. The renderer determines one or more attribute values, such as color, transparency, or depth, for the sample of the three-dimensional scene. The attribute values of one or more samples of the three-dimensional scene are then combined to determine the value of a pixel of the rendered image.

For example, a renderer may trace sample rays into a three-dimensional scene (or project geometry on to an image plane) to render geometry. The intersection of a sampling ray and geometry (or an image sample point in the image plane and the projected geometry) defines a sample of the three-dimensional scene used to determine the value of a pixel of the rendered image. Additionally, illumination, shadowing, scattering, depth of field, motion blur, reflection, and refraction effects are created by casting additional sample rays from an intersected portion of scene geometry into further portions of the three-dimensional scene.

Many visual effects may require multiple samples of the scene data for each image pixel to be effective. For example, reflection effects may require tens or even hundreds of samples to achieve visually accurate results. Undersampling, or using too few samples, can result in unwanted visual artifacts such as aliasing and low detail. However, sampling a three-dimensional scene through ray tracing or other techniques is time consuming and computationally expensive. Thus, reducing the number of samples required by a renderer to produce an accurate and aesthetically-pleasing image can produce enormous gains in performance.

BRIEF SUMMARY OF THE INVENTION

An embodiment of the invention improves rendering performance generally and for a variety of visual effects by selecting between alternate scene representations during rendering. In an embodiment, two or more different scene representations are created for scene data. Each scene representation represents the scene in a different format and provides the renderer with a different degree of detail of the scene. Examples of scene representations include the original scene geometry, sampled point clouds, brick maps, and environment maps. Lighting, shading, geometric, and/or other attributes of the scene may be precalculated and stored in each scene representation at a level of detail appropriate for that type of scene representation or determined on demand.

Typically, a renderer samples scene data to determine one or more images. During rendering, an embodiment of the invention selects one or more of the alternate scene representations for each of the samples based on the size of its filter area relative to the feature sizes or other attributes of the alternate scene representations. For example, one embodiment of the invention may select the scene representation with the largest feature size that is smaller than the filter area associated with a sample. In another example, an embodiment of the invention selects the two alternate scene representations having feature sizes closest to and greater than and less than, respectively, a sample's filter area. This embodiment then blends the sampled values determined from these two scene representations.

The selection of scene representations may vary on a per-sample basis and thus different scene representations may be used for different samples within the same image.

The renderer may use alternate scene representations to sample scene data for general rendering as well as for visual effects such as illumination, shadowing, scattering, depth of field, motion blur, reflection, and refraction effects. Samples may be associated with rays for ray tracing and ray casting renderers or with samples on an image or other projection plane for rasterization renderers.

BRIEF DESCRIPTION OF THE DRAWINGS

The invention will be described with reference to the drawings, in which.

DETAILED DESCRIPTION OF THE INVENTION

An embodiment of the invention improves rendering performance generally and for a variety of visual effects by selecting between alternate scene representations during rendering. Each scene representation represents the scene in a different format and provides the renderer with a different degree of detail of the scene. In an embodiment, the renderer or other software or hardware module selects one or more of the alternate scene representations for each of the samples based on the size of its filter area relative to the feature sizes or other attributes of the alternate scene representations.

Figure 1A:
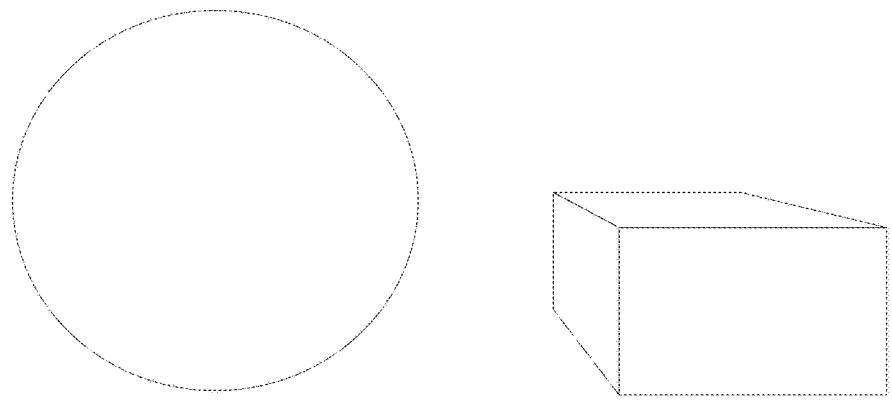
FIGS. 1A-1D illustrate examples of alternate scene representations suitable for use with embodiments of the invention.

FIGS. 1A-1D illustrate examples of alternate scene representations suitable for use with embodiments of the invention. Each of these alternate scene representations uses a different format for representing scene data. FIG. 1A illustrates scene data represented as geometry 100, including particles; surfaces, such as polygons, patch surfaces, subdivision surfaces, implicit surfaces, fractal surfaces; and volumes, such as solid geometry.

Figure 1B:
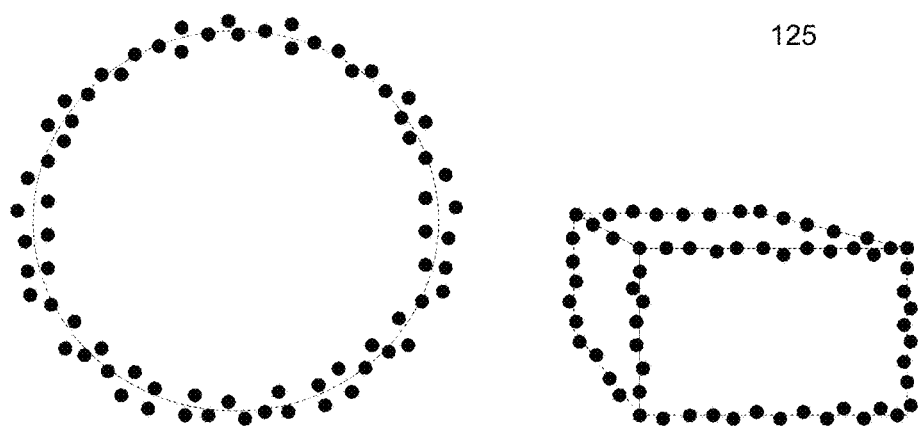

FIG. 1B illustrates scene data represented as a point cloud 125. Point cloud 125 is comprised of a set of points. Each point includes attributes representing a sample of a surface or volume of geometry 100. Examples of attributes include optical attributes, such as color, transparency, diffuse and specular reflectivity, refractivity, and BRDFs; and geometric attributes of the associated geometry, such as depth, connectivity, normal vectors, surface curvature, and the size of the associated patch, polygon, micropolygon, and/or fragment.

In an embodiment, a renderer or other software or hardware module samples the geometry 100 at sufficient intervals to ensure that the shading attribute values are determined in sufficient detail. These values are then assigned to the points of point cloud 125. Additionally, each point of the point cloud 125 is assigned at least one size value, indicating the area or volume of scene data sampled for this point.

Figure 1C:
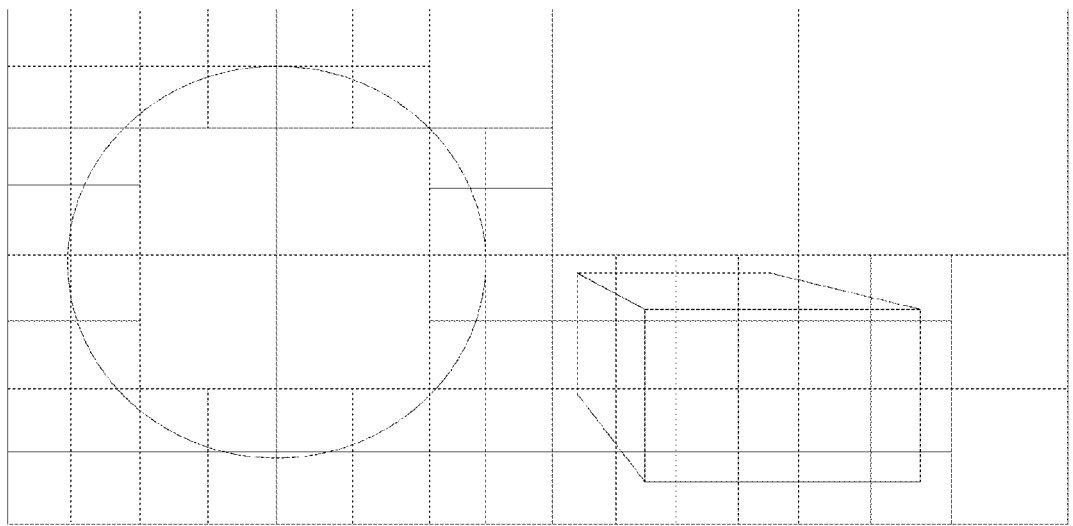

FIG. 1C illustrates scene data as a brick map 150 or other spatial partitioning data structure. Brick map 150 is typically organized as an octree that partitions three-dimensional space into nodes. Each node represents a region of space. Nodes that include scene geometry or objects in the scene can be recursively subdivided into additional nodes representing smaller regions of space. Empty nodes are typically not subdivided. The recursive subdivision of nodes continues until the remaining nodes are empty or until a threshold size limit is reached.

In a brick map 150, each non-empty node of the octree is associated with a voxel grid, such as an 8 by 8 by 8 voxel grid. Each of the voxels are used to store attributes associated with their respective regions of space. In an embodiment, each voxel stores attribute values based on the attributes of the portion of the point cloud 125 contained within its region of space. In another embodiment, each voxel stores attribute values based on the attributes of the portion of geometry 100 within its region of space. Regardless of the source of these attributes, the voxels of the brick map 150 use a filter or other averaging or blending to determine their attribute values from the attribute values of scene data.

Figure 1D:
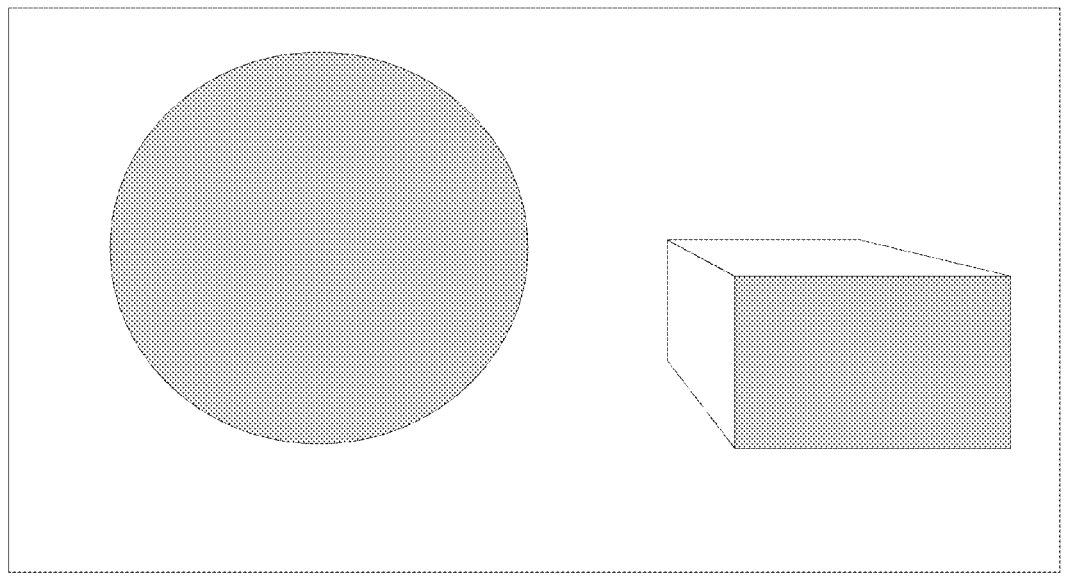

FIG. 1D illustrates an environment map 175. Environment map 175 is a two-dimensional texture map used to store the image of all or portions of a scene. Multiple environment maps 175 may be used to represent viewpoints from different objects in the scene. Environment map 175 may be generated by rendering all or a portion of the scene data from a viewpoint of an object or any other location in the scene, such as the center of a scene.

The example alternate scene representations represent the scene data using different formats of data: geometry; sampled points; volumetric data structures; and two-dimensional images. Each of these alternate scene representations provides a different amount of detail and incurs different time, processing, and memory costs. The attribute values stored in these alternate scene representations, such as point clouds, brick maps, and/or environment maps, may be precalculated or determined on demand by executing lighting, shading, and texturing operations and/or any other arbitrary type of shading program.

An embodiment of the invention improves rendering performance generally and for a variety of visual effects by selecting between alternate scene representations during rendering. Each scene representation represents the scene in a different format and provides the renderer with a different degree of detail of the scene. In an embodiment, the renderer or other software or hardware module selects one or more of the alternate scene representations for each of the samples based on the size of its filter area relative to the feature sizes or other attributes of the alternate scene representations. As described in detail below, an embodiment of the invention may select one or more of these alternate scene representations Further embodiments of the invention may utilize any arbitrary number of alternate scene representations and any other type of data structure known in the art for representing or imitating three-dimensional scene data as an alternate scene representation.

Figure 2:
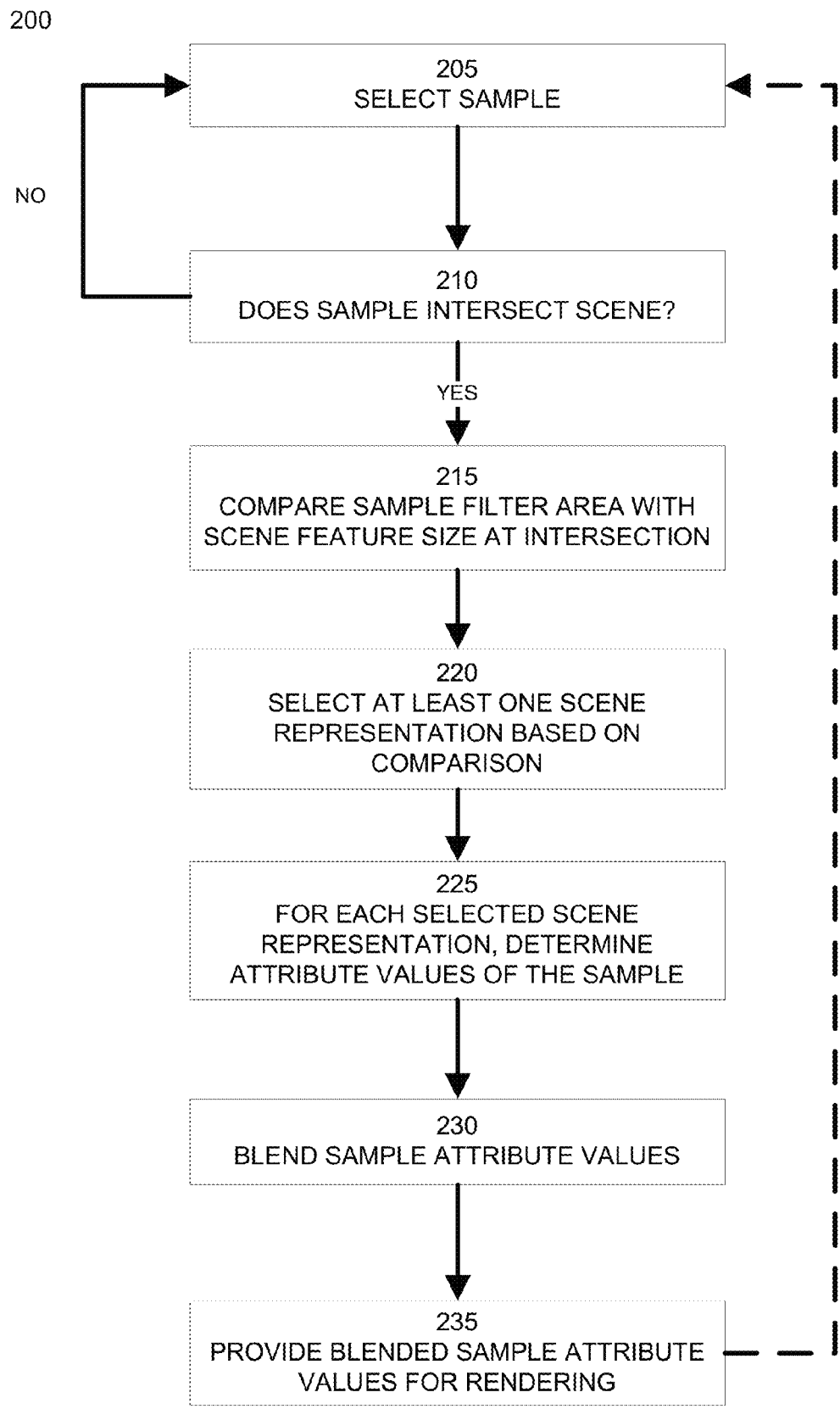
FIG. 2 illustrates a method of sampling scene data using alternate scene representations during rendering to produce visual effects according to an embodiment of the invention.

FIG. 2 illustrates a method 200 of sampling scene data using alternate scene representations during rendering to produce visual effects according to an embodiment of the invention. Step 205 selects a sample of the scene for processing. In an embodiment, the sample may be a sampling ray used by a ray tracing, ray casting, or other type of renderer. In another embodiment, a sample may be a pixel or sub-pixel sample in screen space used by a rasterization renderer. In both of these embodiments, the sample corresponds with a ray or view of the scene originating at the camera viewpoint. In still further embodiments, the sample may be a secondary sampling ray or pixel or sub-pixel sample originating at a location other than the camera and used for visual effects such as reflection, refraction, shadowing, depth of field, and/or illumination.

Step 210 determines if the selected sample intersects (or at least potentially intersects) any objects or other entities in a scene. Each sample may intersect zero, one, or multiple objects or other entities in a scene. In an embodiment, step 210 determines if the selected sample intersects or potentially intersects a scene entity by tracing a ray through one or more of the alternate scene representations. For example, step 210 may trace a ray through the scene geometry, a scene point cloud, or a scene brick map. In another embodiment, step 210 may trace a ray through a low detail version of the scene and/or a space partitioning data structure separate from the alternate scene representation. In yet another embodiment, step 210 may project all or a portion of an alternate scene representation and/or a separate representation of the scene into screen space or another coordinate space (such as the coordinate space associated with a reflective surface point of an object) to determine if the sample intersects or potentially intersects any scene entities.

If the selected sample does not intersect any portion of the scene, then method 200 optionally proceeds from step 210 back to step 205 to select another sample processing.

Conversely, if step 210 determines that the selected sample intersects or potentially intersects scene entities, then method 200 proceeds to step 215.

Step 215 compares the filter area associated with the selected sample with the scene feature size at the intersection location or locations. In an embodiment, each sample is associated with a filter area specifying a region of the scene to be sampled to determine attribute values for this sample. In a further embodiment, the filter area may vary depending on the location of the intersection. For example, the filter area of a sampling ray may increase as a function of the length of this sampling ray. As described in detail below, the filter area of a sample may also depend on factors such as adjacent samples and properties of the scene and scene geometry.

Similarly, scene entities have an associated feature size. In a geometric scene representation, the feature size is a size or average size of a polygon, micropolygon, fragment, patch surface, or other element of geometry in the region of the sample intersection. In a point cloud scene representation, the feature size is a size or average size associated with each point that indicates the area of the scene sampled to generate each point in the point cloud. In a brick map or other spatial partitioning data structure scene representation, the feature size is a size or average size of a voxel, octree cell, or other partition. In an environment map scene representation, the feature size is a size or average size of a texel in the environment map.

An embodiment of step 215 compares the filter area with the sample with the feature sizes of one or more of the alternate scene representations. Step 220 then selects at least one of the alternate scene representations based on the results of this comparison. In an embodiment, step 220 selects the alternate scene representation having the largest feature size that is still smaller than the filter area of the sample. In another embodiment, step 220 selects the two alternate scene representations with the closest feature sizes greater than and less than the filter area of the sample.

Step 225 then determines sample attribute values for each selected alternate scene representation and for each of the intersections. In an embodiment, step 225 samples each selected alternate scene representation with a filter to determine one or more sampled attribute values. Step 225 may use the same filter regardless of the type of selected alternate scene representation or alternatively use a different filter depending on the type of selected alternate scene representation.

If there are multiple selected alternate scene representations and/or multiple intersections of the sample with the scene, optional step 230 blends or combines multiple values for each sampled attribute into a single value for each sampled attribute. Step 235 then returns the value of the sample to the renderer for incorporation into an image either directly or in combination with other samples. Following step 230, method 200 optionally proceeds back to step 205 to select another sample for processing.

Figure 3:
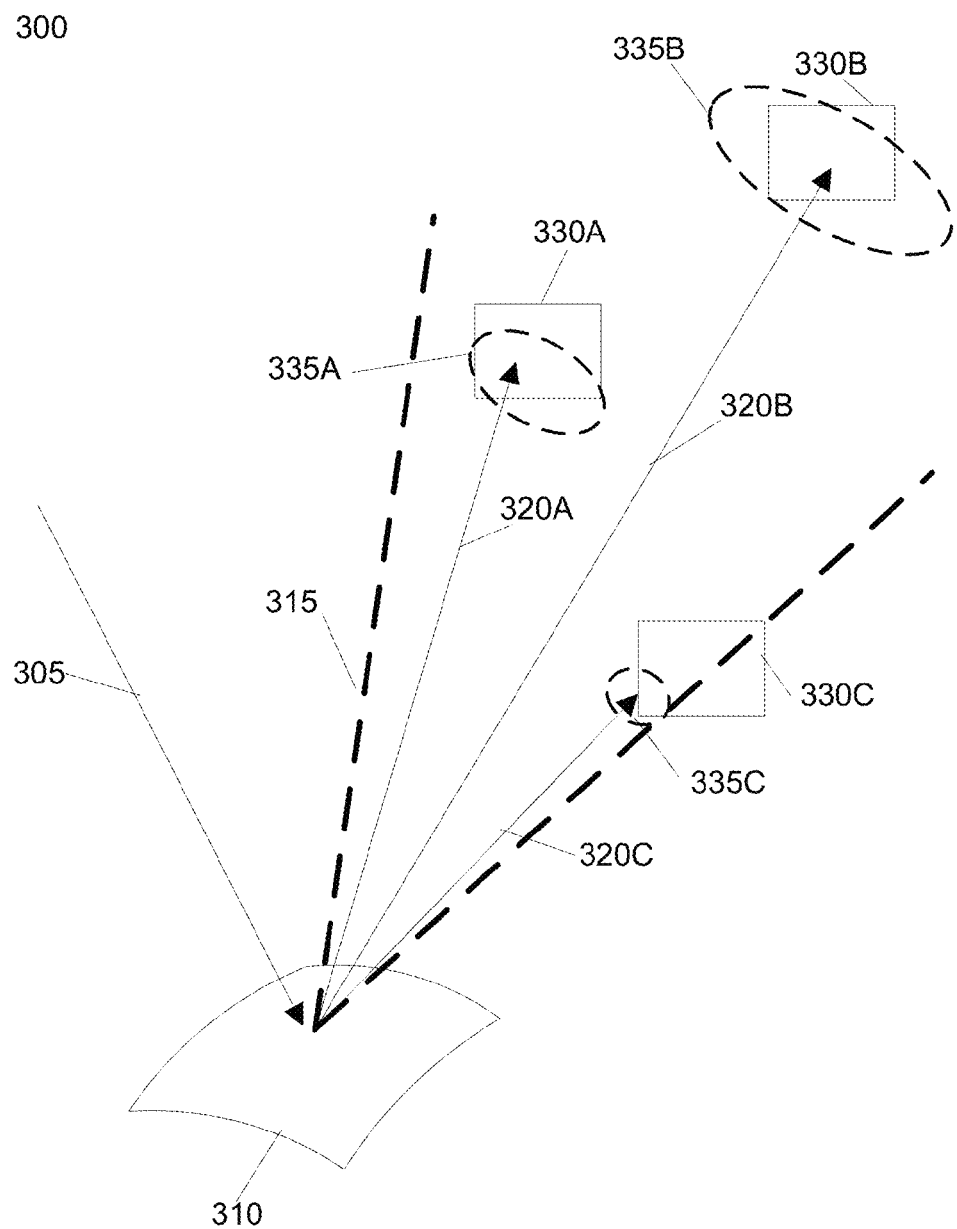
FIG. 3 illustrates example samplings of scene data using samples with different filter areas according to an embodiment of the invention.

As described above, the filter area of a sample may vary based on the location of the sample's intersection with the scene and with properties of other samples and scene entities. FIG. 3 illustrates example samplings of scene data using samples with different filter areas according to an embodiment of the invention. FIG. 3 illustrates an example 300 of a reflection generated using ray tracing. This example 300 is intended for the purpose of illustration and embodiments of the invention using samples with varying filter sizes may be used for other effects in rendering, such as samples associated with an image plane, refraction, illumination, and shadowing, and with other types of rendering. Ray tracing traces the path of light rays through a scene to create an image. Ray tracing typically works backwards from an image sample point in an image, tracing a light ray from the image sample point back through the scene to objects and eventually to one or more light sources.

An incoming ray 305 strikes a point on a reflective surface 310. The renderer then creates one or more reflected rays 320 from this point of contact. The orientation of the reflected rays is determined in part by the normal vector of surface 310. The reflected rays 320 may be generated within a cone of interest 315 that may be determined based at least in part from the curvature of the surface 310 at the point of contact and the material properties associated with the surface 310. Additionally, the renderer may specify the number of reflected rays generated within this cone of interest based on the material properties of the surface 310, the curvature of the surface 310, and the desired image quality and/or rendering performance. Reflected rays may be distributed and orientated within the cone of interest based on a pattern or randomly or pseudo-randomly.

In example 300, the renderer has generated at least three reflected rays 320A, 320B, and 320C. For each of the reflected rays, a renderer traces the path of the reflected ray through the scene, potentially intersecting one or more additional reflective or non-reflective objects, such as objects 330A, 330B, and 330C, or one or more light sources.

For each surface 330 intersected by a reflected ray 320, the renderer determines surface lighting and shading attributes values. These attributes are combined with the attributes determined from other reflected rays to determine the color, shading, and other attributes of the point on surface 310. In an embodiment, the renderer uses a filter associated with each of the reflected rays 320 to sample the objects 330 and determine attribute values for the reflected rays 320.

Example 300 illustrates the filter areas 335 of these filters. In this example, each of the reflected rays 320 is assigned an equal angular portion of the cone of interest 315. Because the cone of interest 315 diverges with distance from the reflective surface 310, the filter area 335B is the largest of the filter areas 335 due to reflected ray 320B being the longest. In this example, the filter area increases a function of ray or path length associated with each sample or reflected ray. If the number of samples or reflected rays 320 were to be changed or a different distribution of samples were selected, then the filter areas 335 would vary accordingly.

Figure 4:
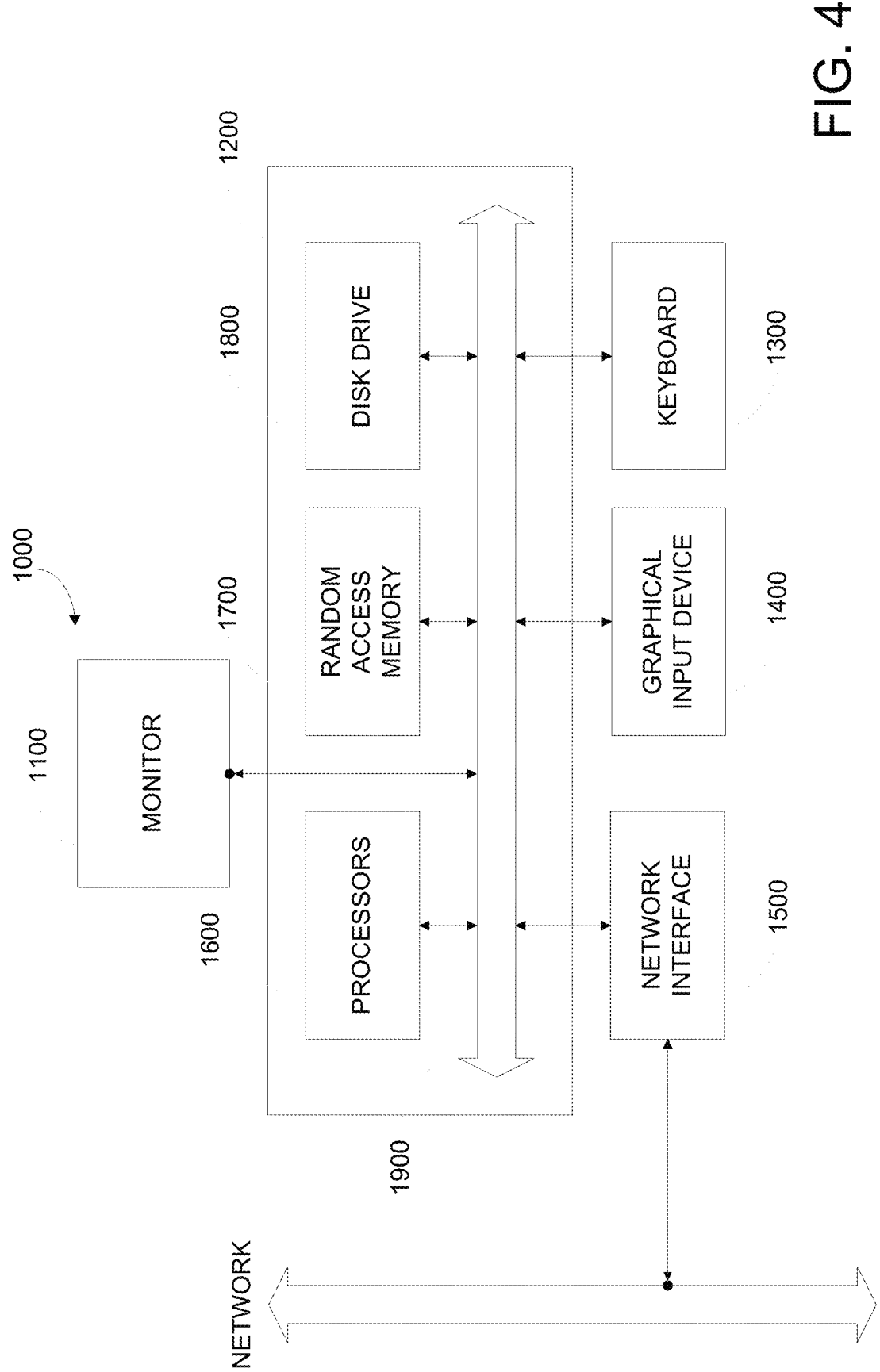
FIG. 4 illustrates a computer system suitable for implementing an embodiment of the invention.

FIG. 4 illustrates a computer system suitable for implementing an embodiment of the invention. Computer system 1000 typically includes a monitor 1100, computer 1200, a keyboard 1300, a user input device 1400, and a network interface 1500. User input device 1400 includes a computer mouse, a trackball, a track pad, graphics tablet, touch screen, and/or other wired or wireless input devices that allow a user to create or select graphics, objects, icons, and/or text appearing on the monitor 1100. Embodiments of network interface 1500 typically provides wired or wireless communication with an electronic communications network, such as a local area network, a wide area network, for example the Internet, and/or virtual networks, for example a virtual private network (VPN).

Computer 1200 typically includes components such as one or more processors 1600, and memory storage devices, such as a random access memory (RAM) 1700, disk drives 1800, and system bus 1900 interconnecting the above components. Processors 1600 can include one or more general purpose processors and optional special purpose processors for processing video data, audio data, or other types of data. RAM 1700 and disk drive 1800 are examples of tangible media for storage of data, audio/video files, computer programs, applet interpreters or compilers, virtual machines, and embodiments of the herein described invention. Other types of tangible media include floppy disks; removable hard disks; optical storage media such as DVD-ROM, CD-ROM, and bar codes; non-volatile memory devices such as flash memories; read-only-memories (ROMS); battery-backed volatile memories; and networked storage devices. Disk drive 1800 can include one or more hard disk drives connected to the computer 1200 via an internal connection, such as parallel or serial ATA, or via an external connection, such as iSCSI or other storage area network standards. Disk drive 1800 can use redundancy, such as a RAID subsystem, to improve performance, data integrity, and drive uptime.

Further embodiments can be envisioned to one of ordinary skill in the art after reading the attached documents. For example, soft refraction, illumination, and other effects can be determined in a similar manner as soft reflection effects described above. For refraction, illumination, and other effects, the rays from the incident surface are generated according to the principles of refraction, illumination, or any other desired effect, rather than the principles of reflection. For example, a soft refraction effect can be created by creating refraction rays that are orientated according to the index of refraction of the intersected surface, rather than the cone of interest used by soft reflection effects.

In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method of rendering a computer graphics image of a three-dimensional scene, the method comprising:

receiving, at one or more computer systems, scene data describing the three-dimensional scene, wherein the scene data comprises a first representation of a three dimensional entity in the scene and a second representation of the entity, wherein the first and second representations describe the entity in the scene using different features;

determining, with the one or more processors associated with the one or more computer systems, an intersection between a sample of the scene and the entity, wherein the entity is represented in the scene at the intersection using at least one of the first and second representations;

comparing, with the one or more processors associated with the one or more computer systems, an area of the sample with a size of at least one feature of at least one of the first and second representations, wherein the size of features is different between the first and second representations;

selecting, with the one or more processors associated with the one or more computer systems, at least one of the first and second representations based on the comparison; and generating, with the one or more processors associated with the one or more computer systems, information describing the sample using the selected representation.

2. The method of claim 1, wherein selecting the at least one of the first and second representations comprises identifying a representation of the entity having an associated feature size smaller than the area of the sample.

3. The method of claim 1, wherein the area of the sample is determined based at least in part on location of the intersection.

4. The method of claim 3, further comprising determining location of the sample based on at least a path length from an origin of the sample to the location of the intersection.

5. The method of claim 4, wherein the origin comprises an image plane.

6. The method of claim 4, wherein the origin comprises a point on another entity in the scene.

7. The method of claim 1 wherein:

selecting the at least one of the first and second representations based on the comparison comprises selecting both the first and second representations, wherein the first representation has a first feature size that is less than the area of the sample and the second representation has a feature size that is greater than the area of the sample; and generating the information describing the sample using the selected representation comprises sampling each of the first and second representations and combining the results of the sampling.

8. The method of claim 1, wherein the first representation or the second representation describe the entity using features each represented by a volumetric data structure.

9. The method of claim 8, wherein the volumetric data structure includes a voxel grid.

10. The method of claim 8, wherein the volumetric data structure includes an octree.

11. The method of claim 1, wherein the first representation or the second representation describe the entity using features each represented by a point in a point cloud.

12. The method of claim 1, wherein the first representation or the second representation describes the entity using features each represented by a texture value of an environment map rendered from a viewpoint within the scene.

13. The method of claim 1, wherein the first representation or the second representation describe the entity using features each represented by geometry.

14. The method of claim 1, wherein generating the information describing the sample using the selected representation comprises retrieving previously stored and predetermined shading attributes from a portion of the selected representation.

15. A non-transitory computer-readable storage medium including instructions adapted to direct a processor of a computer system for rendering a computer graphics image of a three-dimensional scene, the non-transitory computer-readable storage medium comprising:

code for receiving scene data describing the three-dimensional scene, wherein the scene data comprises a first representation of a three dimensional in the scene and a second representation of the entity, wherein the first and second representations describe the entity in the scene using different features;

code for determining an intersection between a sample of the scene and the entity, wherein the entity is represented in the scene at the intersection using at least one of the first and second representations;

code for comparing an area of the sample with a size of at least one feature of at least one of the first and second representations, wherein the size of features is different between the first and second representations;

code for selecting at least one of the first and second representations based on the comparison; and code for generating information describing the sample using the selected representation.

16. The non-transitory computer-readable storage medium of claim 15, wherein the code for selecting the at least one of the first and second representations comprises code for identifying a representation of the entity having an associated feature size smaller than the area of the sample.

17. The non-transitory computer-readable storage medium of claim 15, wherein the area of the sample is determined based at least in part on location of the intersection.

18. The non-transitory computer-readable storage medium of claim 17, further comprising code for determining location of the sample based on at least a path length from an origin of the sample to the location of the intersection.

19. The non-transitory computer-readable storage medium of claim 18, wherein the origin comprises an image plane.

20. The non-transitory computer-readable storage medium of claim 18, wherein the origin comprises a point on another entity in the scene.

21. The non-transitory computer-readable storage medium of claim 15 wherein:

the code for selecting the at least one of the first and second representations based on the comparison comprises code for selecting both the first and second representations, wherein the first representation has a first feature size that is less than the area of the sample and the second representation has a feature size that is greater than the area of the sample; and the code for generating the information describing the sample using the selected representation comprises code for sampling each of the first and second representations and combining the results of the sampling.

22. The non-transitory computer-readable storage medium of claim 15, wherein the first representation or the second representation describe the entity using features each represented by a volumetric data structure.

23. The non-transitory computer-readable storage medium of claim 22, wherein the volumetric data structure includes a voxel grid.

24. The non-transitory computer-readable storage medium of claim 22, wherein the volumetric data structure includes an octree.

25. The non-transitory computer-readable storage medium of claim 15, wherein the first representation or the second representation describe the entity using features each represented by a point in a point cloud.

26. The non-transitory computer-readable storage medium of claim 15, wherein the first representation or the second representation describes the entity using features each represented by a texture value of an environment map rendered from a viewpoint within the scene.

27. The non-transitory computer-readable storage medium of claim 15, wherein the first representation or the second representation describe the entity using features each represented by geometry.

28. The non-transitory computer-readable storage medium of claim 15, wherein the code for generating the information describing the sample using the selected representations comprises code for retrieving previously stored and predetermined shading attributes from a portion of the selected representation.

* * * * *